United States Patent [19]

Ozaki et al.

[11] Patent Number: 5,057,944
[45] Date of Patent: Oct. 15, 1991

[54] MULTIPLEX ROTATING MAGNETIC HEAD SYSTEM FOR MULTIPLY RECORDING AND ERASING AUDIO AND VIDEO SIGNALS

[75] Inventors: Shinji Ozaki, Funabashi; Juichi Morikawa, Katsuta; Hideo Zama, Katsuta; Mashanori Kochi, Katsuta; Makoto Ibe, Katsuta, all of Japan

[73] Assignee: Hitachi, Ltd., Tokyo, Japan

[21] Appl. No.: 232,935

[22] Filed: Aug. 16, 1988

[30] Foreign Application Priority Data

Aug. 19, 1987 [JP] Japan .................. 62-204145

[51] Int. Cl.⁵ .......................... H04N 5/782
[52] U.S. Cl. .......................... 360/19.1; 360/64; 360/70
[58] Field of Search ........... 360/19.1, 60, 14.1, 360/18, 57, 64, 66, 70, 84

[56] References Cited

U.S. PATENT DOCUMENTS

| | | | |
|---|---|---|---|
| 4,633,332 | 12/1986 | Higurashi et al. | 360/19.1 X |
| 4,679,101 | 7/1987 | Teyuka | 360/60 |
| 4,811,121 | 3/1989 | Sekimoto et al. | 360/19.1 |

FOREIGN PATENT DOCUMENTS 59-142703 8/1984 Japan .
60-22705 2/1985 Japan .

Primary Examiner—Roy N. Envall, Jr.
Assistant Examiner—W. R. Young
Attorney, Agent, or Firm—Fay, Sharpe, Beall, Fagan, Minnich & McKee

[57] ABSTRACT

A multiplex recording/reproducing system with at least four video signal recording/reproducing magnetic heads mounted on a rotating body with a predetermined interval in the direction of rotation of the rotating body. At least four audio signal recording/reproducing magnetic heads are mounted on the rotating body, alternately with the video signal recording/reproducing magnetic heads. The magnetic tape is forwarded while being wrapped on the rotating body over a region extending at least a multiple of the predetermined interval. Recording/reproducing circuits record and reproduce the video signal and the audio signal while switching over the video signal and the audio signal recording/reproducing magnetic heads in a predetermined order for every predetermined period. An erase signal is supplied to at least one of the audio signal recording/reproducing magnetic heads, which is disposed preceding to the video signal recording/reproducing magnetic head, which records the video signal on a magnetic tape track, during a period of time where no audio signal is supplied thereto.

12 Claims, 11 Drawing Sheets

FIG. 3B

| SWITCH | 52 | 53 | 54 | 55 | 56 | 57 | 58 | 59 | 64 | 65 | 66 | 67 |
|---|---|---|---|---|---|---|---|---|---|---|---|---|
| ANGLE | | | | | | | | | | | | |
| −225° | OPEN | OPEN | OPEN | OPEN | CLOSED | OPEN | CLOSED | CLOSED | CLOSED | CLOSED | OPEN | OPEN |
| −135° | CLOSED | OPEN | OPEN | OPEN | OPEN | OPEN | CLOSED | CLOSED | OPEN | CLOSED | OPEN | OPEN |
| −45° | CLOSED | OPEN | OPEN | OPEN | OPEN | OPEN | CLOSED | OPEN | OPEN | CLOSED | OPEN | OPEN |
| +45° | CLOSED | OPEN | OPEN | OPEN | OPEN | OPEN | OPEN | OPEN | OPEN | CLOSED | CLOSED | CLOSED |
| +135° | CLOSED | CLOSED | OPEN | OPEN | OPEN | OPEN | OPEN | OPEN | OPEN | OPEN | CLOSED | CLOSED |
| +225° | OPEN | CLOSED | OPEN | OPEN | OPEN | OPEN | OPEN | OPEN | CLOSED | OPEN | CLOSED | CLOSED |
| +315° | OPEN | CLOSED | OPEN | OPEN | OPEN | OPEN | OPEN | OPEN | CLOSED | OPEN | CLOSED | CLOSED |

MULTIPLEX ROTATING MAGNETIC HEAD SYSTEM FOR MULTIPLY RECORDING AND ERASING AUDIO AND VIDEO SIGNALS

BACKGROUND OF THE INVENTION

This invention relates to a rotating magnetic head system for a video tape recorder (VTR) and in particular to a multiplex recording and erasing rotating magnetic head system for multiply recording audio and video signals.

In general for a VTR it is known that 2 heads exclusively used for recording audio signals are mounted on a rotating drum and that FM audio signals are recorded, superposedly on video signals in the recording tracks on the tape (Japanese patent unexamined publication, JP-A-59-142703). Recently a development of incorporating a VTR and camera has occurred and a demand to reduce the size of the development has become strong. In order to respond to this demand, it is known that, as disclosed in Japanese patent unexamined publication JP-A-60-22705, n video signal recording/reproducing magnetic heads ($n \leq 4$) are mounted on a small diameter rotating drum at equal intervals ($360°/n$), that a magnetic tape is wound on the rotating drum at least over a region of $360° \times \{(n-1)/n\}$ and that the video signals are recorded/ reproduced while switching over from one to another of the video signal recording/reproducing magnetic heads, every time that region has been scanned. On the other hand a small size VTR has been strongly desired, which has a small diameter rotating drum including a magnetic head exclusively used for erasing mounted on the rotating drum so as to be provided with the flying erase function apart from recording the FM audio signals.

According to the prior art techniques, if it is desired to add the FM audio multiplex recording function to the small diameter head drum device, 4 video magnetic heads are necessary by the technique disclosed in JP-A-60-22705. Further 4 audio magnetic should be added thereto so that the technique described above can be applied to the FM multiplex recording technique disclosed in JP-A-59-142703. Further, in order that the device having the functions stated above can have the flying erase function, another rotating erasing head having a function to erase a wider width area extending over 4 tracks should be added, and therefore 9 magnetic heads are necessary in total. When the small diameter rotating head drum technique disclosed in JP-A-60-22705 is applied to the VHS system, if the number heads is 4, the diameter of the rotating drum is 41.3 mm. When the audio magnetic heads are added to such a small diameter rotating drum device and further a rotating erasing head is provided, it is difficult to fabricate it from the view point of the space. Additionally the number of parts increases, which decreases remarkably the productivity of the small diameter drum device and in addition it increases the cost.

SUMMARY OF THE INVENTION

The object of this invention is to provide a multiplex recording rotating magnetic head system having also the rotating erasing function by using magnetic heads as small in number as possible, i.e. by using only the magnetic heads necessary for recording/reproducing the video signals and those necessary for recording/ reproducing the audio signals.

In order to achieve the above object, in a multiplex recording rotating magnetic head system according to this invention, at least 4 video signal recording/ reproducing heads are mounted on a rotating body (rotating drum) in equally spaced relationship at a predetermined interval therebetween in the direction of its periphery. The same number of audio signal recording/reproducing heads are mounted thereon so that the video and audio signal recording/ reproducing heads are alternately disposed (i.e. one of the latters is interposed between adjacent two of the formers). In the rotating magnetic head drum device, on which these magnetic heads are mounted, a magnetic tape runs while wrapping the drum over a region corresponding to a multiple of the video-head interval, preferably ($n-1$) times of the interval, n being the total number of the video signal recording/reproducing magnetic heads or the audio signal recording/reproducing magnetic heads. These magnetic heads are switched over one to another or operated in a predetermined order for every predetermined period of time (scanning period of the region corresponding to the multiple of the video-head interval described above), so that the video signal and the audio signal are superposedly recorded. Further they are so constructed that an erase signal is supplied to one or more audio signal recording/reproducing magnetic heads, which are in contact with the magnetic tape at positions preceding in the tape-running direction along the recording track to the video signal recording/ reproducing magnetic head, which is positioned to record the video signals, by utilizing a vacant scanning period, i.e. period, during which no audio signal is supplied thereto.

In a typical example it is so selected that the number of video signal magnetic heads and that of audio signal magnetic heads are 4, respectively, that the predetermined interval is 90°; that the region, over which the magnetic tape is wrapped, is $90° \times 3 = 270°$; and that the interval of switching over the magnetic heads is equal to this scanning period of 270°.

In a preferred embodiment, each video signal recording/reproducing magnetic head has an azimuth which is inclined in the same direction as that of audio signal recording/reproducing magnetic head disposed just preceding to that video signal magnetic head in the direction of rotation of the rotating body but different from that of the succeeding audio signal recording/ reproducing magnetic head. Generally, an azimuth which is inclined clockwise with respect to a center line perpendicular to the direction of recording track is called as "positive azimuth" and an azimuth which is inclined counterclockwise with respect to the center line is called as "negative azimuth" as shown in FIG. 2. Thus, if one video magnetic head has a positive azimuth, an audio magnetic head just preceding to the one video magnetic head has a positive azimuth and an audio magnetic head just succeeding to the one video magnetic head has a negative azimuth. Further, in the case where $n=4$, the erase signal is supplied to the audio signal recording/reproducing magnetic to an active audio signal recording/reproducing magnetic head, which is made active to record the audio signal by 90° on the rotating drum, or to both of the audio signal magnetic heads which are preceding by 90° and succeeding by 90° to the active audio signal head.

As described above, in a rotating head device, in which n video signal recording/reproducing heads and n audio signal recording/reproducing heads, n being greater than 3, are arranged and a magnetic tape is wrapped on the rotating head over a region including (n−1) mounting intervals of the magnetic heads, there is a vacant scanning period for the magnetic heads, i.e. period, during which the magnetic tape is moved in contact with magnetic heads, but no recording signal is supplied. According to this invention, since erasing of the magnetic tape is effected by utilizing efficiently this vacant scanning period for the audio signal recording-/reproducing magnetic heads to supply an erase signal during this period, it is not necessary to add any rotating erasing head exclusively used for the erasing.

In the case where n=4, in the standard recording mode, erase signals are supplied selectively to the two audio signal recording/reproducing magnetic heads, one preceding by 90° and the other succeeding by 90° on the rotating body, with respect to the active audio signal recording/reproducing magnetic head, which is recording FM audio signals, before video signals are superposedly recorded thereto. In this way, the most tracks, on which image signals are to be recorded, are erased by the erase signal described above before the recording. This is because the magnetic heads preceding and succeeding by 90° are in the positions, where they can erase the two widthwise edge portions of the track, on which the video signal should be superposedly recorded thereafter.

On the other hand, in the long time recording mode or low speed recording mode, an erase signal is supplied selectively to the audio signal recording/ reproducing magnetic head preceding by 90° on the rotating body, with respect to the active audio signal recording/reproducing magnetic head, which is recording FM audio signals, before video signals are superposedly recorded. In this case, since the magnetic head preceding by 90° is effective to the most widthwise part of the video signal track, on the magnetic tape which is succeedingly recorded, it is possible to erase most of the unnecessary recorded signal in the same way as that described previously.

In order to operate the recording/reproducing system in the two modes stated above, the magnetic heads are switched over by a switching operation.

The above being accomplished by the arrangement where the audio signal recording/reproducing magnetic head preceding the active audio magnetic head by 90 has the same azimuth as that of the video signal recording/reproducing head and that the audio signal recording/reproducing magnetic head succeeding by 90° has an azimuth different therefrom, in the standard recording mode. Thus, the audio signal recording/reproducing heads which are disposed preceding and succeeding, respectively, to the video signal recording-/reproducing head, and to which the erasing signals stated above are applied, have the same azimuth as that video signal magnetic head and further the audio signal recording/ reproducing head, to which the audio signal is applied, and the video signal recording/reproducing head succeeding thereto have different azimuths. On the other hand, in the long time recording mode, the video signal recording/reproducing magnetic head and the audio signal magnetic head associated therewith have the same azimuth, while the magnetic head, to which the erasing signal is applied, has an azimuth different therefrom.

BRIEF DESCRIPTION OF THE DRAWINGS

FIG. 3B is a scheme for explaining the opened and closed states of different switches in the system indicated in FIG. 1;

DESCRIPTION OF THE PREFERRED EMBODIMENTS

Figure 1:
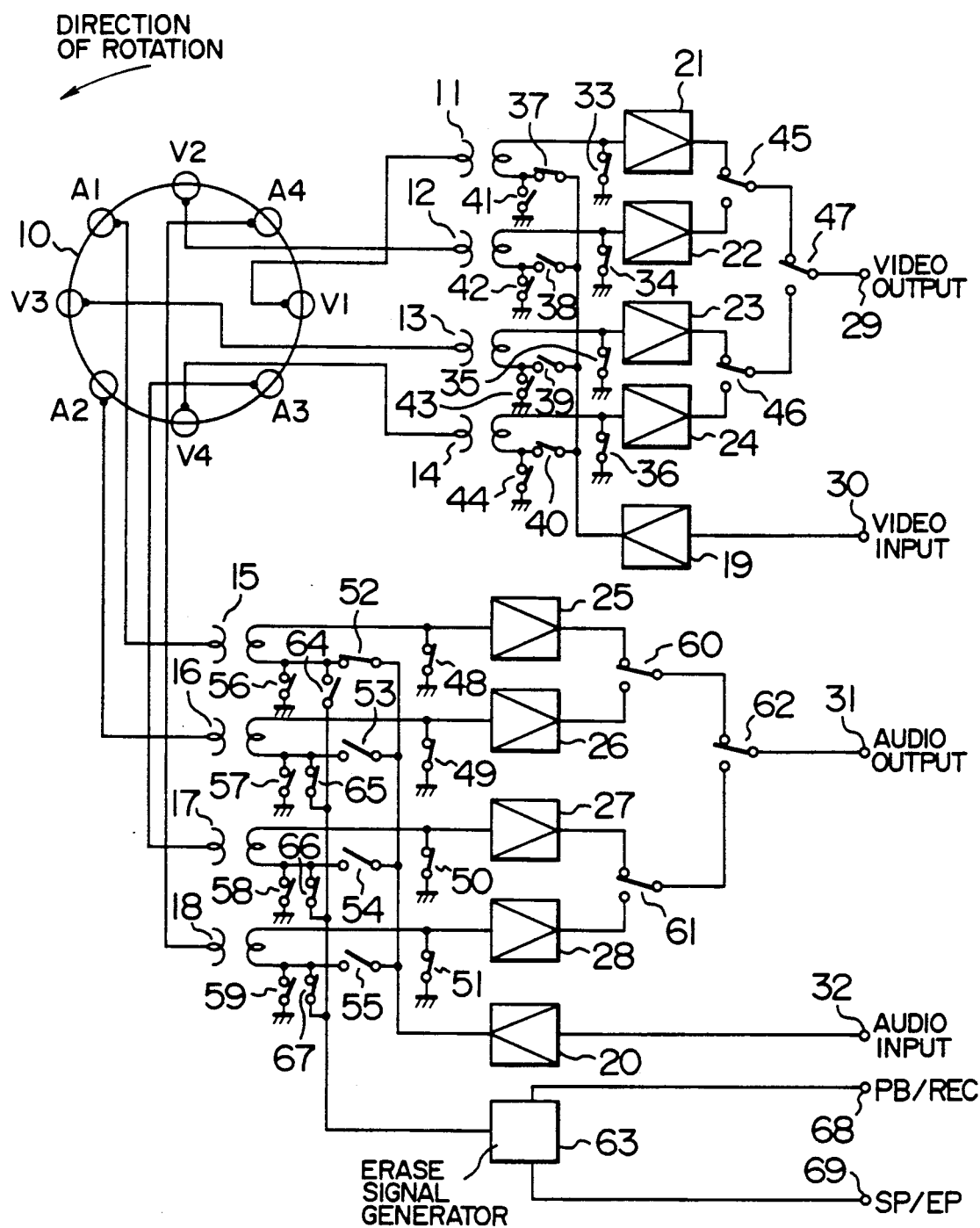
FIG. 1 is a block diagram illustrating the circuit of an embodiment of the multiplex recording rotating magnetic head system according to this invention.

Hereinbelow the embodiments of this invention will be explained, referring to the drawings.

FIG. 1 is a block diagram illustrating the circuit of a multiplex recording rotating magnetic head system according to this invention.

8 magnetic heads V1, V2, V3, V4, A1, A2, A3 and A4 are mounted on the periphery of a rotating magnetic head drum 10 with an interval of 45°. Among them, V1, V2, V3 and V4 are video signal recording/ reproducing magnetic heads, while A1, A2, A3 and A4 are FM audio signal recording/reproducing magnetic heads for superposing FM audio signals on the video signal tape pattern to record them. Consequently both the interval between two video signal recording/reproducing magnetic heads adjacent to each other and the interval between two audio signal recording/reproducing magnetic heads adjacent to each other are 90°. Each of the magnetic heads V1, V2, V3, V4, A1, A2, A3 and A4 is connected to a rotating transformer 11, 12, 13, 14, 15, 16, 17 or 18. They are connected further with a video signal output terminal 29, a video signal input terminal 30, an audio signal output terminal 31 and an audio signal input terminal 32 through recording amplifiers 19 and 20 and reproducing amplifiers 21, 22, 23, 24, 25, 26, 27 and 28.

Switches 33, 34, 35, 36, 37, 38, 39, 40, 41, 42, 43, 44, 45, 46 and 47 disposed around the video signal reproducing amplifiers 21, 22, 23 and 24 switch over from one to the other of the recording and the reproduction modes, and also successively operate the magnetic heads V1, V2, V3 and V4 in a predetermined order at the recording or the reproduction mode. On the other hand switches 48, 49, 50, 51, 52, 53, 54, 55, 56, 57, 58, 59, 60, 61 and 62 disposed around the audio signal reproducing amplifiers 25, 26, 27 and 28 switch over similarly from one to the other of the recording and the reproduction modes, and also successively operated in a predetermined order the audio signal magnetic heads A1, A2, A3 and A4.

The erase signal is applied to the audio signal magnetic heads A1, A2, A3 and A4 from an erase signal generating circuit 63 through switches 64, 65 66 and 67 and the rotating transformers 15, 16, 17 and 18. This erase signal generating circuit 63 is controlled by a signal inputted through a recording/ reproduction switching over control input terminal 68 and a standard recording mode/long time recording mode switching over control input terminal 69.

The rotating magnetic head drum 10 has a diameter of 41.3 mm and rotates with a speed of 2700 rpm. The magnetic tape is wrapped thereon over about 270° and forwarded so that one field of the standard TV signal is scanned or recorded for every ¾ rotation.

At the recording of the video signal, the video signal inputted through the terminal 30 is applied, while the switches 33, 34, 35 and 36 are closed and the switches 41, 42, 43 and 44 are opened, to the magnetic head V1 when the switch 37 is closed, to the magnetic head V2 when the switch 38 is closed, and so fourth. In this way it is applied to the magnetic heads in the order of V1→V2→V3→V4 and recorded.

At the reproduction the switches 41, 42, 43 and 44 are closed and the switches 37, 38, 39 and 40 are opened. The switches 33, 34, 35 and 36 are successively operated, corresponding to the reproducing magnetic head, and reproduced video signals are outputted from the terminal 29 through the switches 45, 46 and 47 in the order of V1→V→V3→V4.

The audio signals are recorded and reproduced in the same manner as stated above. That is, at the recording the switches 48, 49, 50 and 51 are closed; the switches 56, 57, 58 and 59 are opened; and the switches 52, 53, 54 and 55 are successively operated so that the audio signals inputted through the terminal 32 are applied to the magnetic heads in the order of A1→A2→A3→A4. On the other hand, at the reproduction the switches 56, 57, 58 and 59 are closed; the switches 52, 53, 54 and 55 are opened; the switches 48, 49, 50 and 51 are successively operated so that the audio signals are outputted from the terminal 31 through the switches 60, 61 and 62 in the order of A1→A2→A3→A4.

Figure 2:
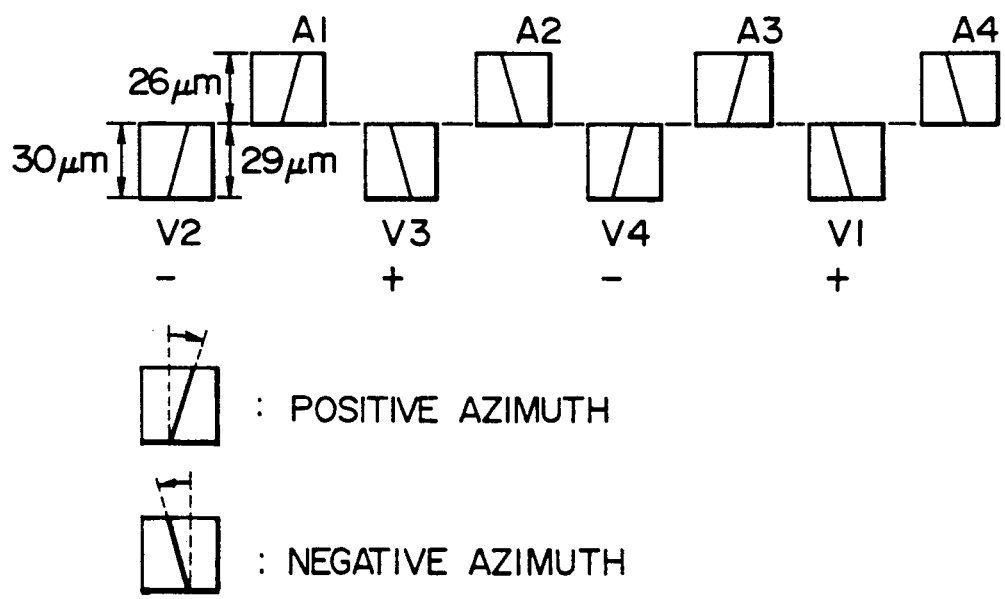
FIG. 2 is a scheme showing the arrangement of the magnetic heads in the embodiment indicated in FIG. 1.

FIG. 2 shows the track width (magnetic head core width) the relative step height or level difference between and the azimuth angles of the video magnetic heads V1, V2, V3 and V4, and the audio magnetic heads A1, A2, A3 and A4 mounted on the rotating magnetic head drum 10 indicated in FIG. 1. The azimuthal angles are ±6° for the video signals and ±30° for the audio signals. The track width of the video signal magnetic heads V1, V2, V3 and V4 is 30 μm and that of the audio signal magnetic heads A1, A2, A3 and A4 is 26 μm, the relative step height therebetween being 29 μm. Further, in the image and audio signal recording/reproducing heads, as indicated in FIG. 2, the audio signal recording/ reproducing head preceding to each video signal recording/reproducing head in the direction of rotation on the rotating drum (it is supposed that the drum rotates towards the right in FIG. 2) (e.g. A1 to V2, A2 to V3, A3 to V4 and A4 to V1) has the same azimuth as the latter and the audio signal head succeeding thereto (e.g. A1 to V3, A2 to V4, and A3 to V1) has an azimuth different from that of the latter.

Figure 3A:
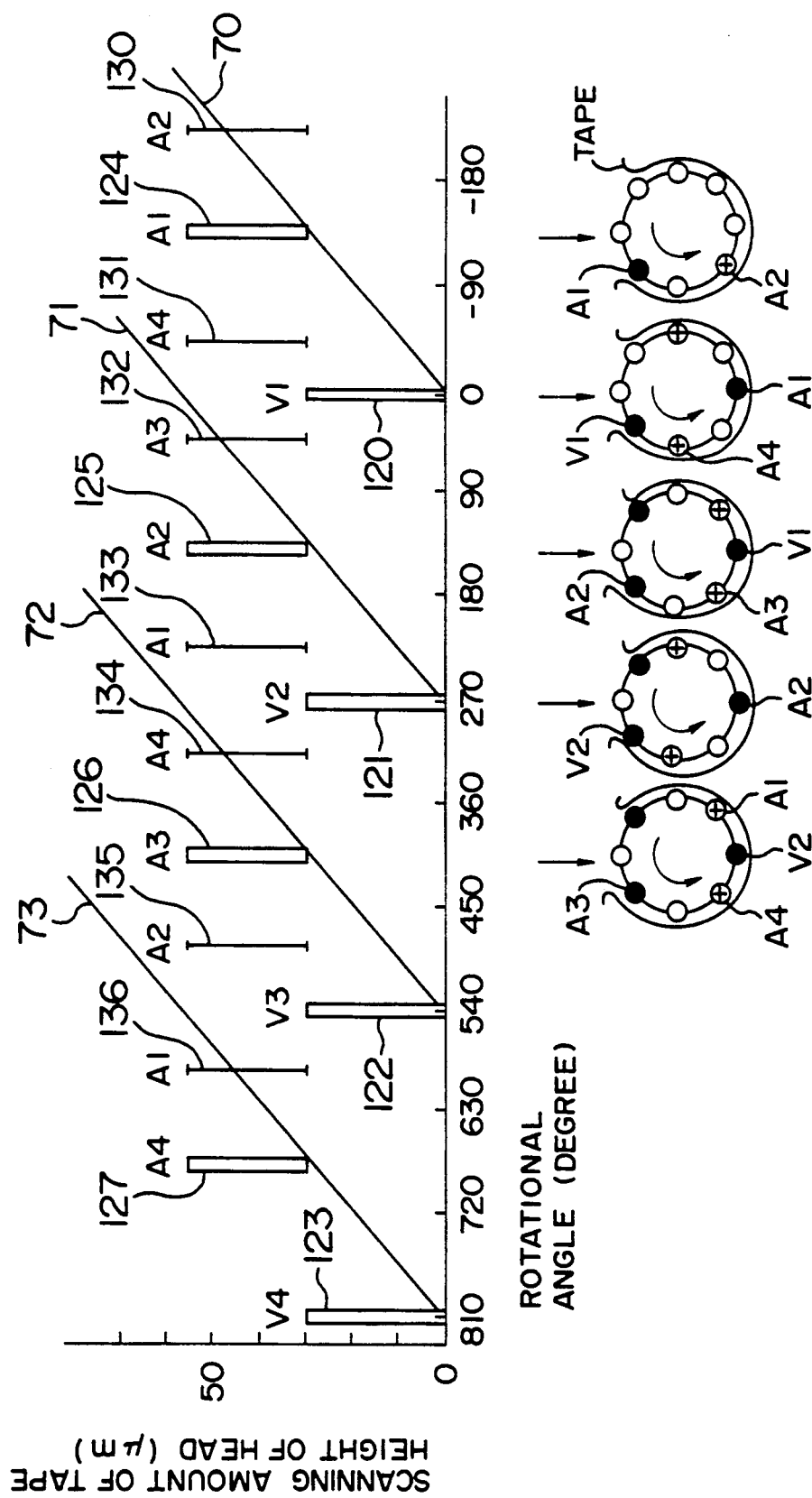
FIG. 3A. is a scheme for explaining the work of the system indicated in FIG. 1 in the standard recording mode.

FIG. 3A shows the scanning amount of the tape and the state of the head in use (head connected with the input circuit) in the standard recording mode, when the operation switching indicated in FIG. 1 is effected by means of the rotating magnetic head device constructed as stated above the tape being developed along the direction of rotation of the heads. Here the abscissa represents the rotational angle (rotational phase) of each of the heads in use measured from the point of time where the video head V1 enters the magnetic tape plane. The ordinate represents the relative step height of the heads V1 the V4 and A1-A4, i.e. the position of each of heads having the core width (30 μm for V1-V4 and 26 μm for A1-A4) and the relative step height (29μm), which are the same as those indicated in FIG. 2. Consequently, the length and the position in the vertical direction of the vertical lines V1-V4 and A1-A4 indicate the core width and the relative step height, respectively, and the position thereof in the horizontal direction indicates the point of time, where each of them enters the magnetic tape plane after a given rotational angle with respect to the head V1. Further, in this figure, there are indicated the scanning amount of the tracks scanned on the magnetic tape, which are formed by each of the heads in use in the direction of the head movement relative to the magnetic tape in contact with the magnetic head (in the figure only the lower edges of the tracks scanned by the video magnetic heads A1-V4 are shown by inclined lines 70-73). Therefore, in this case, the ordinate indicates the position of the scanned tracks in the width direction of the tape, referring to one side edge of the tape.

Vertical double lines 120, 121, 122 and 123 indicate that the image heads V1, V2, V3 and V4 enter the tape plane at rotational phases of 0°, 270°, 540° and 810°, respectively, to record/reproduce the video signal. Among the vertical lines representing the audio heads A1, A2, A3 and A4 those indicated by double lines 124, 125, 126 and 127 indicate that the audio heads enter the tape plane at the rotational phases corresponding to the respective positions to record/reproduce the audio signal. Further, among them, those indicated by single lines 130, 131, 132, 133, 134, 135 and 136 indicate that they enter the tape plane at the rotational phases corresponding to the respective positions to effect the erase operation. All of the video signal recording/reproducing period, audio signal recording/ reproducing period and erasing period last during a period of time, where the relevant head scans the tape over 270°, from the point of time, where it enters the tape plane. The interval between tracks i.e. center-to-center distance of two tracks is represented by the distance between the lines 71 and 70 in the widthwise direction of the tape. For example, it is the distance between the starting point of the line 70 and the intersection of the line 71 and the extension of the vertical line V1, which is 58 μm.

In the lower part of FIG. 3A there is indicated the position of the heads working at various rotational angles, in which the black circles indicate that the heads are active for recording/reproducing the video signal or the audio signal; the cross marks indicate that the heads are in the erase operation; and the white circles indicate that the heads are idle.

Figure 3C:
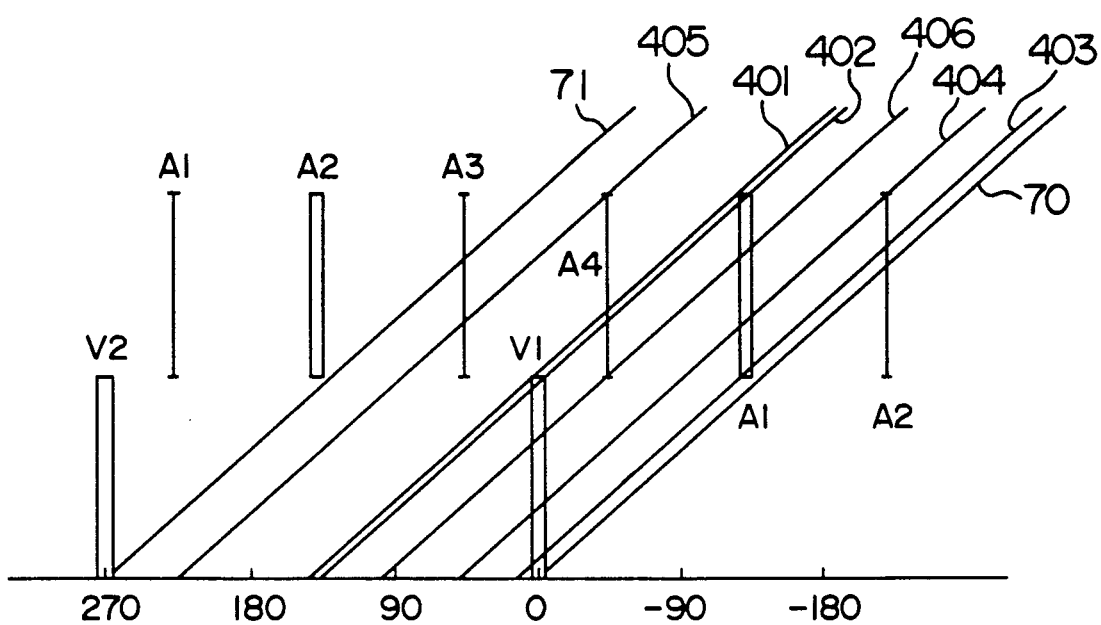
FIG. 3C is a scheme for explaining the width of the track, which each of the head traces.

According to FIG. 3A it is possible to know the positional relationship on the track among the audio signal magnetic heads in the erase operation, the audio signal magnetic head recording the audio signal and the magnetic head recording the video signal. For example, as indicated in FIG. 3C, when inclined lines 401-406 passing through the upper extremity of the line V1, the upper and lower extremities of A1, the upper extremity of A2 and the upper and lower extremities of A4, respectively, are drawn parallelly to the inclined lines 70, 71, the direction of these inclined lines is the direction of track and it is regarded that these heads A2, A1, A4 and V1 move along these lines in this order relative to the tape obliquely towards the upper sight. Consequently A2 is at the top and V1 is at the last. A portion including an edge of the video track, which should be formed by the succeeding head V1, (portion disposed between the inclined lines 70 and 404) is erased in advance by the head A2 and then FM audio signals are recorded by the head A1. Next a part of the FM audio signals, which have been recorded immediately before by the head A1 and a portion of the video track including the other edge (i.e. a part disposed between the inclined lines 405 and 406) are erased and finally video signals can be recorded by the head V1 superposedly on the recorded FM audio signals stated above. A small portion, which is not erased, (portion disposed between the inclined lines 404 and 406) can remain between the portion erased by the head A2 and that erased by the head A4. However, since this portion is very narrow and it can be expected that a fairly great amount of the signal recorded thereon is erased by the FM audio signals by means of the head A1, this gives rise to no problem.

The relationship indicated in FIG. 3B can be obtained by summarizing the switching timings of the switches relative to the rotational angle of the head drum as shown in FIG. 3A for effecting the switching operations of the audio signal magnetic heads A1, A2, A3 and A4, explained referring to FIG. 1 and FIG. 3A. The switches 52, 53, 54, 55, 56, 57, 58, 59, 64, 65, 66 and 67 are opened and closed, depending on the rotational angle, as indicated in the table of FIG. 3B.

Figure 4:
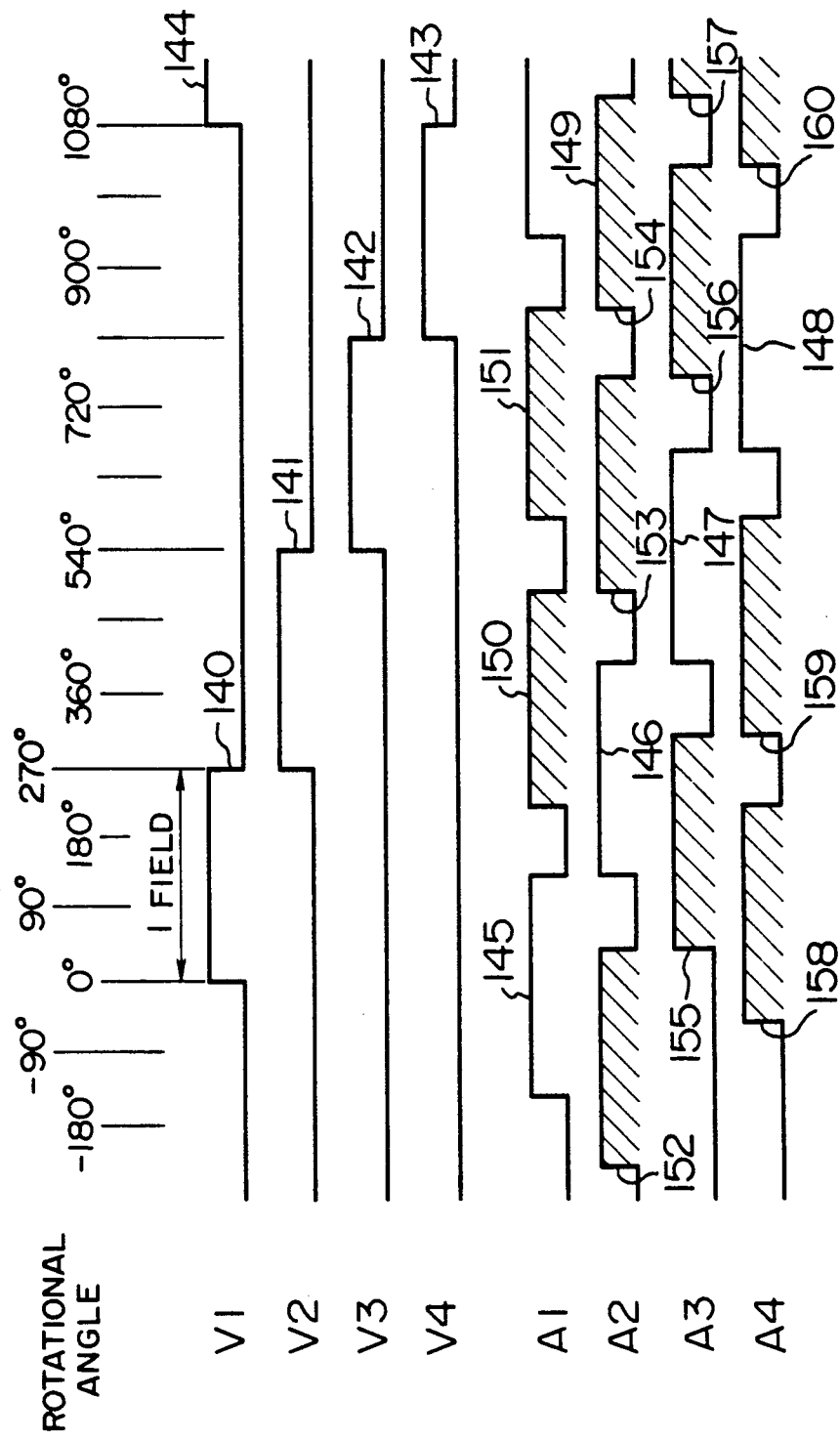
FIG. 4 is a scheme showing the timing of the work indicated in FIG. 3A.

FIG. 4 is a timing chart showing the switching operation thereof. In the figure, the high levels 140, 141, 142, 143 and 144 indicate that the associated video signal magnetic heads are recording, respectively, and the high levels 145, 146, 147, 148 and 149 indicate that the associated audio signal magnetic heads are recording. Further, the high levels with hatchings for the audio signal magnetic heads A1, A2, A3 and A4 indicate that the associated audio magnetic heads are involved in the erasing operation. The erasing is effected by applying erase signals to the magnetic heads, which are at positions of ±90° with respect to an active one of the audio signal magnetic heads A1, A2, A3 and A4, which records audio signals, preceding to the video signal magnetic heads V1, V2, V3 and V4, as described previously, (e.g. the heads A2 and A4, when the head A1 records the audio signals). For a signal having a frequency of 6-9 MHz higher than that of the video brightness signal (e.g. 4 MHz) is used.

In this embodiment, as it can be clearly seen from FIG. 3A, the width of the track traced by the video signal magnetic heads V1, V2, V3, V4 is 30 μm, the center-to-center distance of adjacent two tracks is 58 μm, as described previously; and the non-traced portion is 58 μm-30 μm=28 μm. This guard band portion can be erased by the erase signal applied to the audio signal magnetic heads A1, A2, A3 and A4 and thus unnecessary recorded signals are cancelled. This track arrangement is in agreement with the standards for the standard recording mode. Now the relation of the azimuth of the magnetic heads in each of the tracks will be examined. For example, if it is supposed that the azimuth of the video signal magnetic head V1 for recording video signals is positive, the azimuth of the audio signal magnetic head A1 preceding it for recording audio signals and that of the magnetic head A2 for erasing signals before recording the audio signals are negative and the azimuth of the magnetic head A4 for erasing signals before recording the video signals is positive. In this way it is possible to prevent interference between the video and the FM audio signals.

Figure 5:
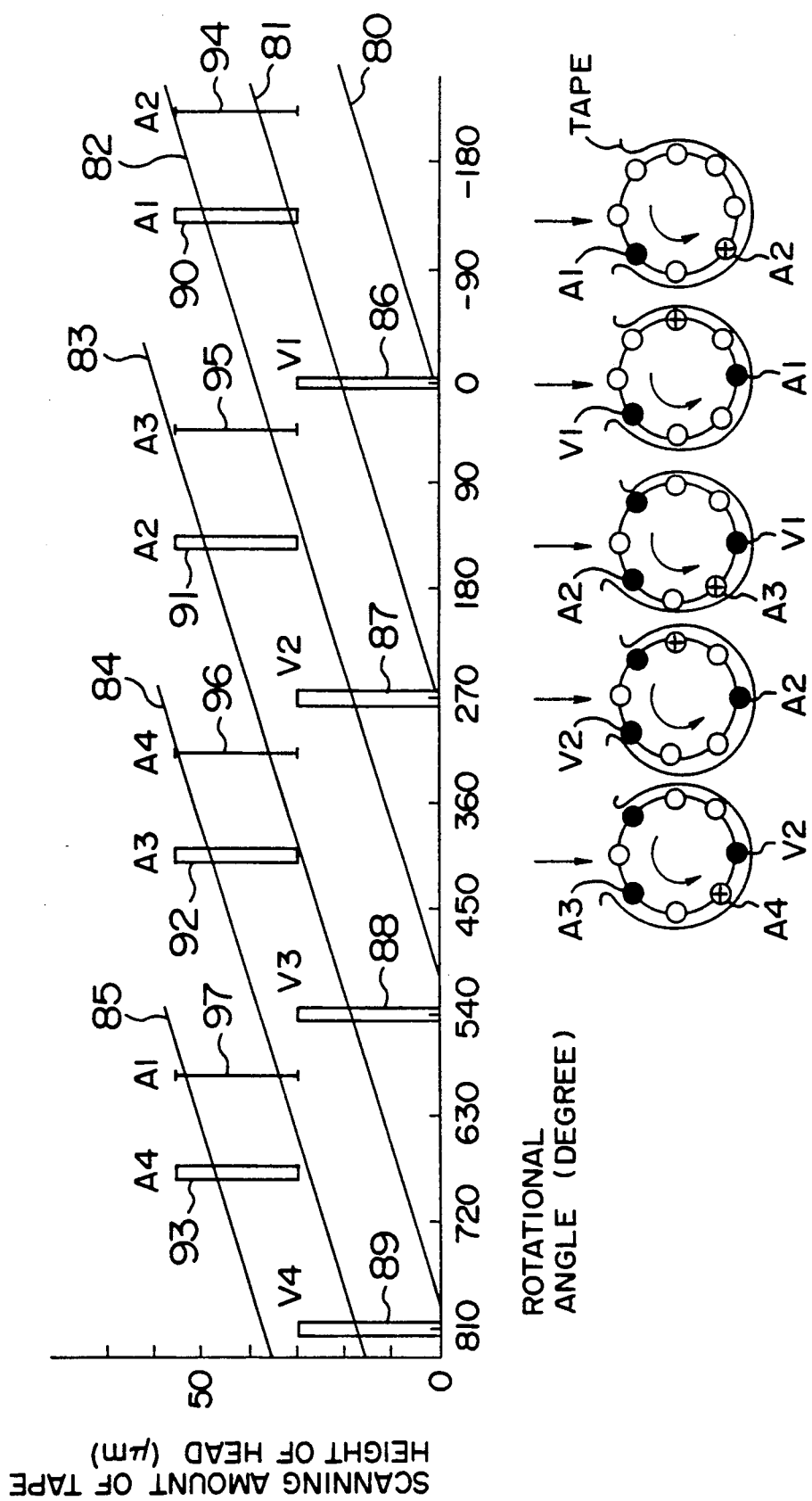
FIG. 5 is a scheme for explaining the work of the system indicated in FIG. 1 in the long time recording modes.

FIG. 5 shows the tape trace relation of the video signal magnetic heads V1, V2, V3 and V4 and the audio signal magnetic heads A1, A2, A3 and A4, operations to record video and audio signals and the erasing operations for the long time recording mode in the same way as FIG. 3A. Therefore double lines 86, 87, 88, 89, 90, 91, 92 and 93 indicate magnetic heads, which are recording the video signal or the audio signal as in the preceding embodiment and single lines 94, 95, 96 and 97 representing the audio signal magnetic heads A1, A2, A3 and A4, respectively, indicate that the respective magnetic head is in the course of erasing. In this recording mode the guard band as formed in the standard recording mode is not formed. Inclined lines 80, 81, ..., 85 indicate boundaries between two adjacent tracks. Now the relation, with which the magnetic heads follow the track will be examined e.g. for the track between the inclined lines 81 and 82. At first the magnetic head A2 indicated by the line 94 effects the erase operation. Then the magnetic head A1 indicated by the line 90 records FM audio signals. Thereafter the magnetic head V2 indicated by the line 87 records video signals. In this case, the magnetic head A2 for erasing signals and the magnetic head A1 for recording the audio signals cover almost the total width of the track traced by the video magnetic head V2 for recording video signals. Further, concerning the relation of the azimuth, if it is supposed that the azimuth of the video magnetic head V2 indicated by 87 is negative, that of the audio magnetic head A2 indicated by 94 is positive and that of the audio magnetic head A1 indicated by 90 is negative.

Figure 6:
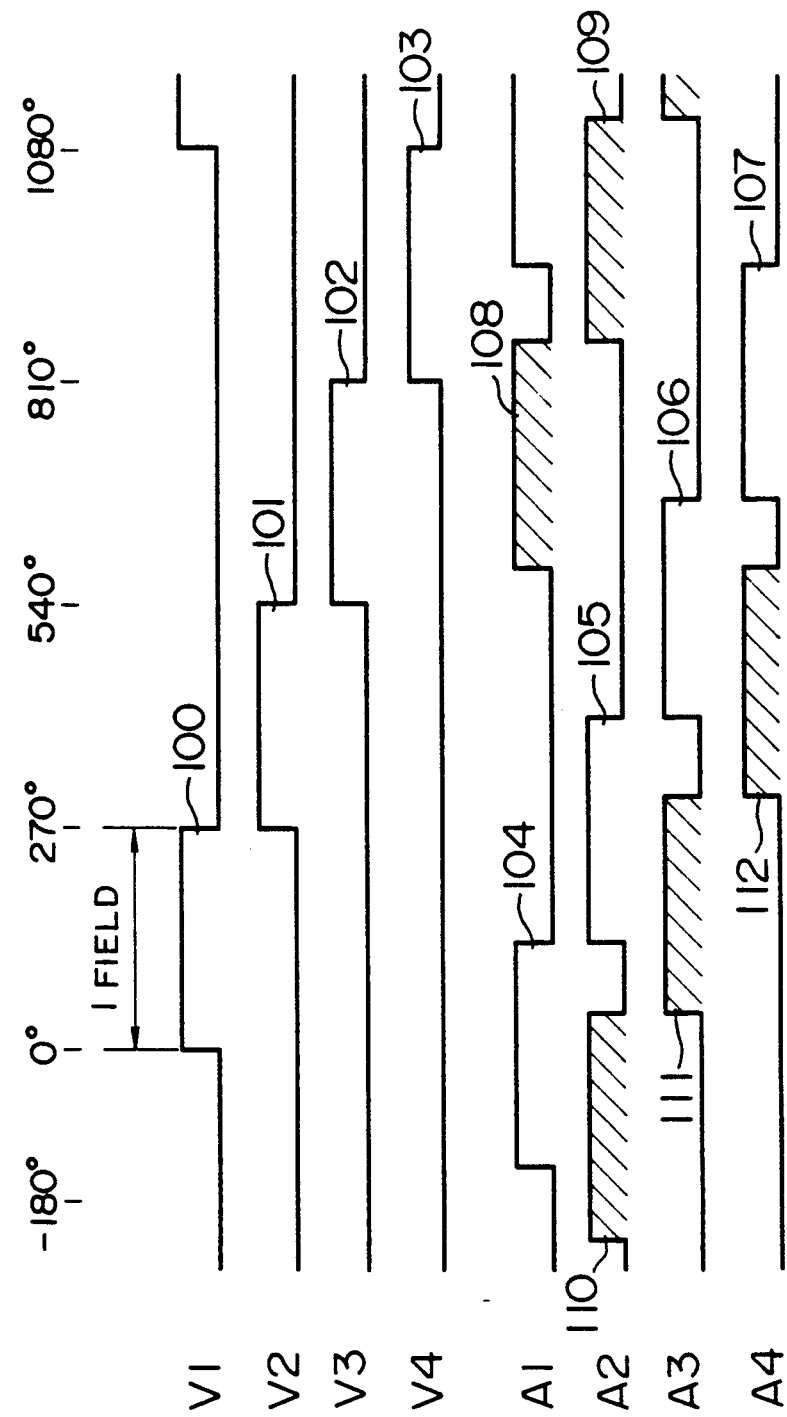
FIG. 6 is a scheme showing the timing of the work indicated in FIG. 5.

FIG. 6 is a timing chart showing the work of the magnetic heads in the case of FIG. 5. In the figure the high levels 100, 101, 102 and 103 each indicates that the associated magnetic heads is recording video signals; the high levels 104, 105, 106 and 107 each indicates that the associated magnetic head is recording the audio signal; and the high levels with hatchings 108, 109, 110, 111 and 112 each indicates that the associated magnetic head is involved in course of the erasing operation. The erasing is effected, as described previously, by the head preceding to the audio magnetic head which is active for recording the audio signal by 90° (e.g. the head A2, when the audio signal head A1 is active to record the audio signal; A3, when A2 is active; A4, when A3 is active; and A1, when A4 is active). On the other hand the video recording is effected by the head succeeding to the active audio magnetic head for recording the audio signal by 405° (e.g. the head V2, when the audio signal head A1 is active; V3, when A2 is active; V4, when A3 is active; and V1, when A4 is active). In this embodiment the erasing of the whole surface of the tape is possible before the trace by the video signal magnetic heads V1, V2, V3 and V4.

It is understood from the above explanation that the erasing is possible only by using one or two audio magnetic heads in one tracing by each video head depending on the standard recording mode or the long time recording mode is implemented. Further, in this case, the level of the erase signal generating circuit 63 can be arbitrarily set by a signal inputted through the terminal 69.

Another embodiment of this invention will be explained, referring to FIG. 7.

Four (4) pairs of double azimuth heads each having the video signal magnetic heads V1, V2, V3 and V4 combined with the audio signal magnetic heads A1, A2, A3 and A4 are mounted on the periphery of a rotating magnetic head drum 200 with an interval of 90°. The magnetic heads are connected with rotating transformer 11, 12, 13, 14, 15, 16, 17 and 18. The structure of the circuit after the rotating transformers is identical to that indicated in FIG. 1 and therefore it is omitted.

Figure 8:
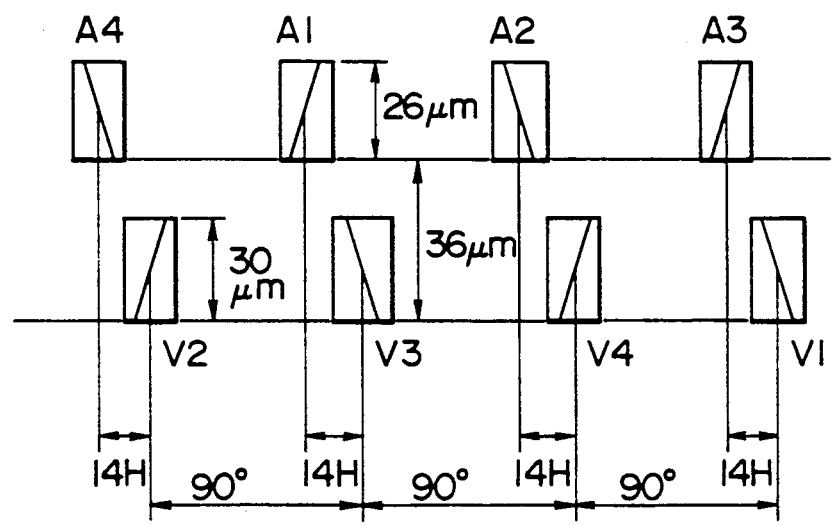
FIG. 8 is a scheme showing the arrangement of the magnetic heads in the embodiment indicated in FIG. 7.

FIG. 8 shows the head track width on the rotating magnetic head drum device 200, the relative step height, the relative mounting positions and the azimuthal relation. The track width for the video signal is 30 μm and that for the audio signal is 26 μm similarly to those described in the preceding embodiment. The video signal magnetic heads V1, V2, V3 and V4 and the audio signal magnetic heads A1, A2, A3 and A4 constitute double azimuth heads, combining A4 with V2, A1 with V3, A2 with V4 and A3 with V1. The relative step height is 36 μm and the gap interval is 14 H (H being 1 horizontal period) =5.4 mm. Further similar to the embodiment indicated in FIGS. 1 and 2, the audio signal magnetic head just preceding to the associated video signal magnetic head has the same azimuth as the latter, while the audio signal magnetic head just succeeding thereto has an azimuth different from that of the latter.

Figure 9:
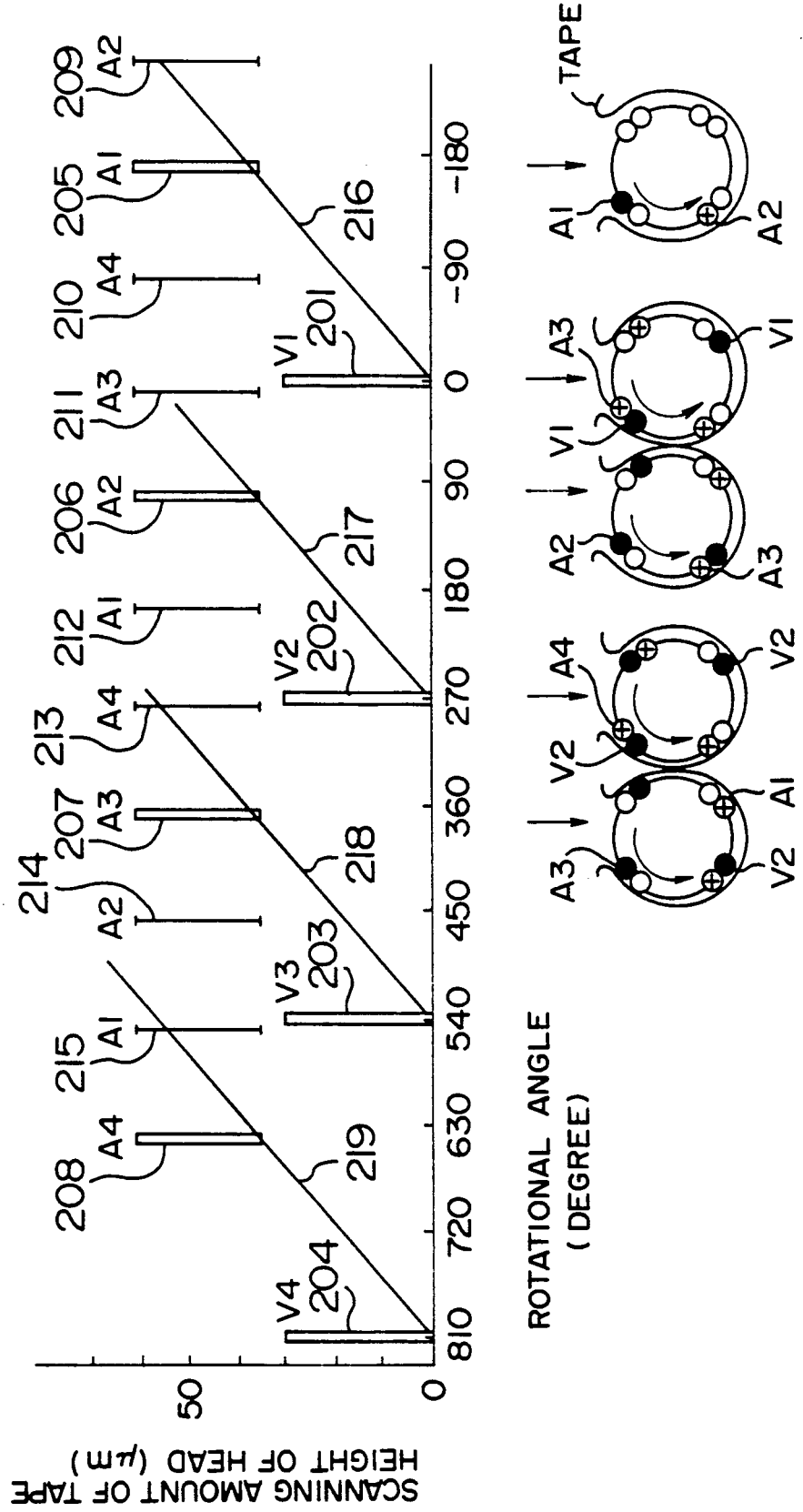
FIG. 9 is a scheme for explaining the work of the system indicated in FIG. 7 in the standard recording mode.

When the switching operation indicated in FIG. 3B of the preceding embodiment is effected in the above structure, in the standard recording mode, the tape scanning and the state of the used heads indicated in FIG. 9 are realized. The representation of this figure is identical to that used for FIG. 3A and double lines 201, 202, 203, 204, 205, 206, 207 and 208 represent the video and the audio signal recording/ reproducing heads. On the other hand single lines 209, 210, 211, 212, 213, 214 and 215 indicate the erasing operation. Lines 216, 217, 218 and 219 are scanning trajectories of the video signal magnetic heads V1, V2, V3 and V4, respectively.

The erasing is effected in the same way as described in the preceding embodiment. That is, the magnetic heads preceding and succeeding to the active audio magnetic head, which is recording the audio signal, by 90° effect the erasing operation. In this way it is possible to erase the recorded old video signals on the whole surface of the tape before the recording of new video signals. For example the audio signal head A1 indicated by 205 precedes the video signal head V1 indicated by 201 and the heads A2 and A4 indicated by 209 and 210, which are at the positions of ±90° with respect to the audio signal head A1, respectively, effect the erasing operation. In this case, if the azimuth of the video signal head 201 is positive, that of the audio signal head 205 is negative and those of the heads 209 and 210, which are erasing, are positive.

Figure 7:
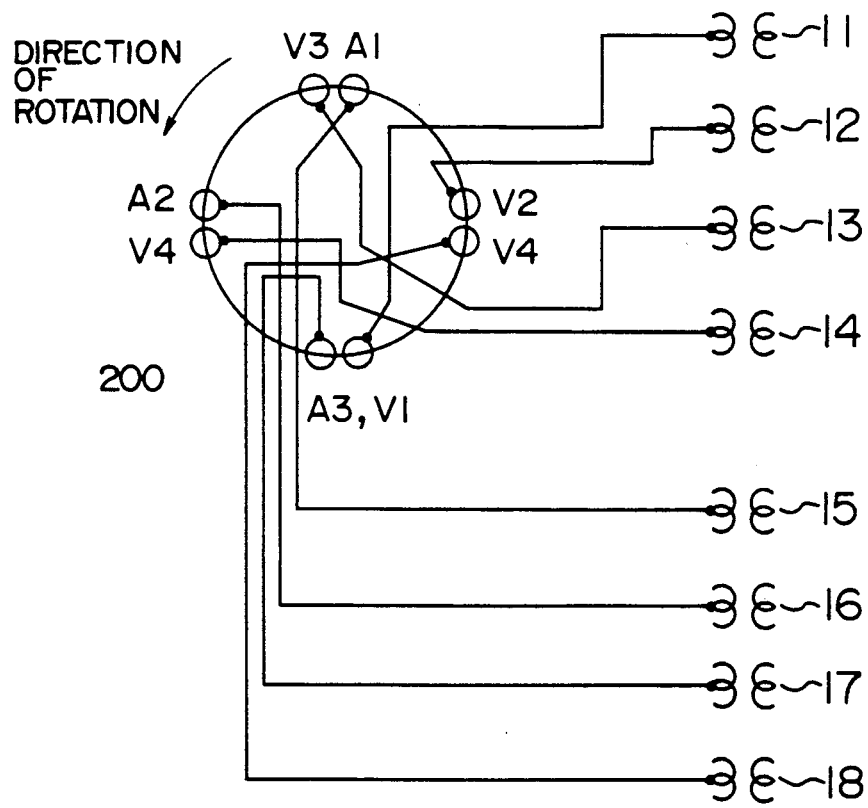
FIG. 7 is a scheme illustrating another embodiment of this invention.
Figure 10:
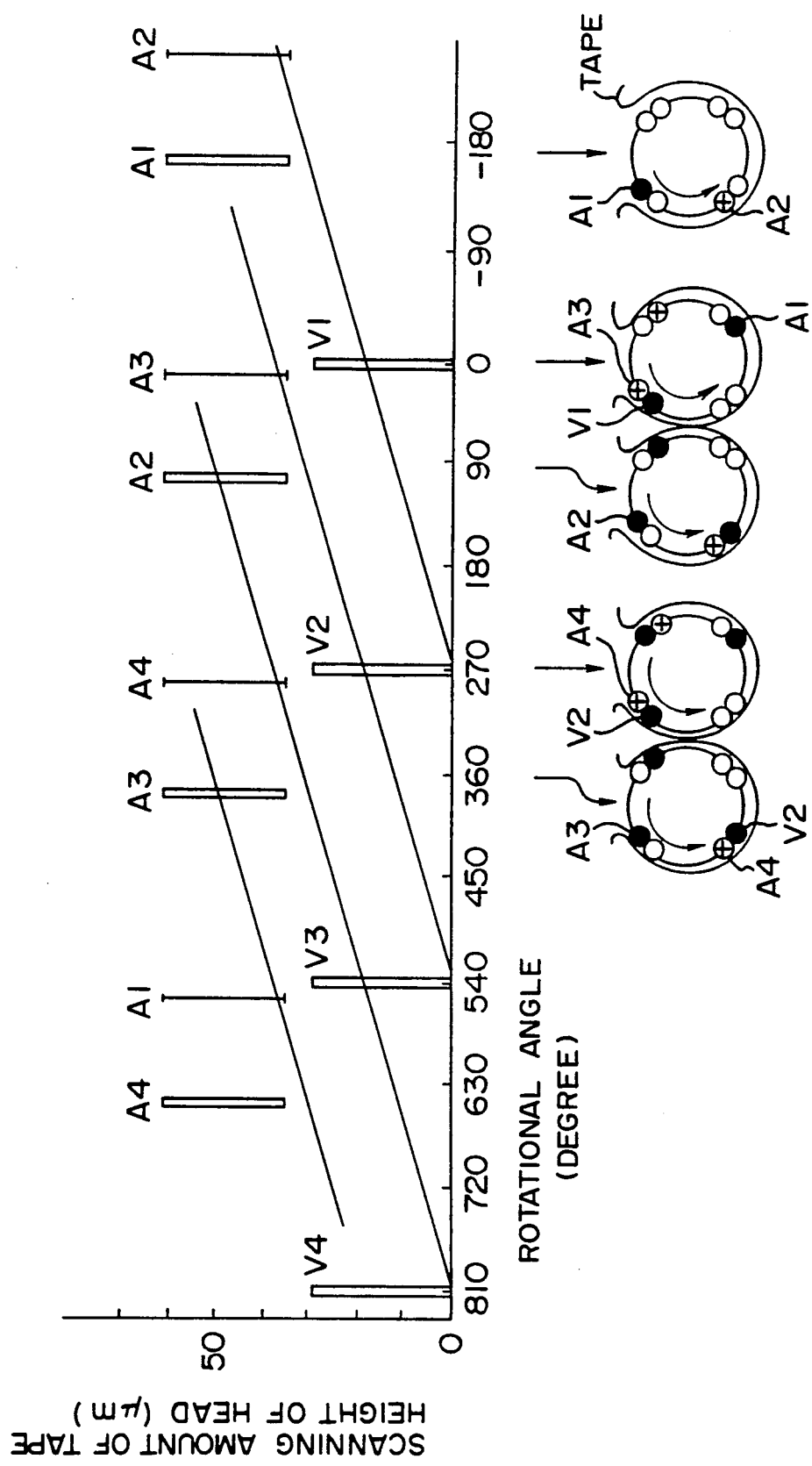
FIG. 10 is a scheme for explaining the work of the system indicated in FIG. 7 in the long time recording mode.

FIG. 10 shows the tape scanning and the state of the used heads in the long time recording mode for the embodiment indicated in FIGS. 7 and 8. For the head operation timing that explained, referring to FIG. 6 for the preceding embodiment, may be used. That is, the erase signal is applied only to the magnetic head preceding the audio signal recording head by 90°. In this way it is possible to erase the recorded signal on the whole surface of the tape before the recording of the video signal.

Although the double azimuth head gap interval is set to 14 H in this embodiment, it is not restricted thereto, but it can be arbitrarily set in the design.

Although, in the above, this invention has been explained, referring to a system having a small diameter rotating magnetic head drum (diameter of 41.3 mm) in a VTR according to the VHS system, provided with audio signal magnetic heads, it is not restricted to these audio signal magnetic heads, but any magnetic head can have the erasing property, if the magnetic gap length is greater than that of the video signal magnetic heads. Therefore it can be applied not only to a head for FM audio signals but also to a head for PCM audio signals.

What is claimed is:

1. A multiplex recording/ reproducing system comprising at least four video magnetic heads mounted on a rotating body with a predetermined interval in a direction of rotation of the rotating body for recording/reproducing a video signal on a magnetic tape; at least four audio magnetic heads mounted on the rotating body alternately with the video magnetic heads; means for forwarding the magnetic tape while wrapping it on the rotating body over its region extending at least a multiple of the predetermined interval; means for switching over the video magnetic heads and the audio magnetic heads, receptively, so that the video magnetic heads and the audio magnetic head are alternately and successively in a predetermined order made active and inactive for recording/reproducing the respective signals; and means for selectively supplying an erase signal through an erase signal supply circuit to the audio magnetic heads while the audio magnetic heads are inactive, timings at which the erase signal is supplied to the inactive audio magnetic heads including a timing for supplying the erase signal to one audio magnetic head which is disposed preceding to the video magnetic head to which the video signal is supplied, and to another one of the audio magnetic heads which is disposed succeeding thereto, both by 90° on said rotating cylinder.

2. The multiplex recording/reproducing system according to claim 1, wherein each of the video signal magnetic heads has anazimuth include in the same direction as that of the audio signal magnetic head preceding thereto in the direction of rotation of said rotating body and in a different direction from that of the audio signal magnetic head succeeding thereto.

3. The multiplex recording/reproducing system according to claim 1, wherein both the number of said video magnetic heads and that of said audio magnetic heads are four.

4. A recording system comprising:
   a rotating cylinder having a circumferential peripheral surface, on which magentic tape is wound;
   at least four video signal magnetic heads mounted on said peripheral surface with a predetermined interval in a direction of rotation of said rotating cylinder;
   at least four other magentic heads for signals other than video signals, mounted on said peripheral surface so that each of them is disposed between adjacent two of said video signal magnetic heads;
   tape drifting means for forwarding a magnetic tape, wrapping it on said peripheral surface over a region extending at least a distance corresponding to a plurality of the predetermined intervals;

video signal processing means of processing video signals;

video signal switching means for selecting said video signal magnetic heads in a predetermined order and connecting in said predetermined order said video signal magnetic heads for a predetermined time period with said video signal processing means;

other signal processing means for processing the signals other than video signals;

other signal switching means for selecting said other signal magnetic heads in a predetermined order, and connecting in said predetermined order said other signal magnetic heads with said other signal processing means;

an erase signal source for generating erase signals; and erase signal switching means or selectively supplying said erase signals to each of said other signal magnetic heads prior to each of said other signal magnetic heads being connected to said other signal processing means.

5. A system according to claim 4, wherein said erase signal switching means selects additionally a different one of said other signal magnetic heads succeeding to and closest to a first other signal magnetic head in the direction of rotation of said rotating cylinder and supplies said erase signals to said selected different other signal magnetic head.

6. A magnetic tape recorder comprising:

a video signal processor for providing a video signal;

an audio signal processor for providing an audio signal;

a rotary head drum;

four video heads mounted on said rotatory head drum with a predetermined interval in a circumference direction of said rotary drum for recording the video signal ona magnetic tape wound around said rotary drum over its region corresponding to at least a multiple of said predetermined interval;

four audio heads mounted alternately with said video heads in the circumference direction on said rotary drum for recording the audio signal on said magnetic tape;

a video signal supply circuit for connecting said video signal processor and said video signal to the video heads, successively in a predetermined order such that said video heads are active when connected and inactive when not connected;

an audio signal supply circuit for connecting said audio signal processor and said audio signal to said audio heads, successively in a predetermined order such that said audio heads are active when connected and inactive when not connected;

wherein the audio heads and the video heads are alternatively and successively connected to the respective processors;

an erase signal generator for providing an erase signal; and an erase signal supply circuit for supplying the erase signal to a first audio head of the audio heads, prior to a first video head of the video heads being connected to the idea signal processor, said first audio head being disposed on said rotary drum preceding said first video head in the direction of rotation of said rotating drum wherein said first audio head receiving the erase signal is inactive, the erase signal being supplied to a second audio head of the audio heads, prior to a second video head of the idea heads being connected to the video signal processor, said second audio head being disposed on said rotary drum preceding said second video head in the direction of rotation said rotating drum wherein said second audio head receiving the erase signal is inactive, the erase signal being supplied to a fourth audio of the audio heads, prior to a fourth video head of he video heads being connected to the video signal processor, said fourth audio head being disposed on said rotary drum preceding said fourth video head in the direction of rotation of said rotating drum wherein said fourth audio head receiving the erase signal is inactive.

7. The magnetic tape recorder of claim 6 wherein the audio heads are spaced at 90° intervals.

8. A method for recording video signals comprising:

processing a video signal through a video signal processor;

processing an audio signal through an audio signal processor;

supplying said video signal through a video supply circuit to at least four video heads spaced around a rotary drum;

supplying said audio signal through an audio supply circuit to at least four audio heads interspersed with the video heads around the rotary drum;

passing a magnetic tape sound around a region of the rotary drum over a multiple of the video heads;

operating the video heads in a predetermined sequence through the video supply circuit to cause the video heads to alternatively be active and inactive, such that when the magentic tape electrically contacts a selected video head, the selected video head is active and the video signal is recorded;

operating the audio heads in a predetermined sequence through the audio supply circuit to cause the audio heads to alternatively be active and inactive, such that when the magnetic tape electrically contacts a selected audio head the selected audio head is active and the audio signal is recorded;

processing an erase signal through an erase signal generator; and, supplying said erase signal, through an erase supply circuit, to all of the audio heads in a predetermined manner wherein each of th audio heads are selected during an inactive state, and further wherein each of the selected inactive audio heads are disposed to precede inactive video heads prior to the inactive video heads being active.

9. The method of claim 8 wherein the passing comprises providing for a scanning period in which the magnetic tape is moved in contact with the video and audio heads.

10. The method of claim 9 wherein the scanning period further includes providing for a vacant scanning period.

11. The method of claim 10 wherein the supplying of the erase signal occurs during the vacant scanning period.

12. The method of claim 8 wherein the supplying said erase signal occurs when recording is occurring at other of the video and audio heads electrically contacting the tape.

* * * * *

UNITED STATES PATENT AND TRADEMARK OFFICE
CERTIFICATE OF CORRECTION

PATENT NO. : 5,057,944
DATED : October 15, 1991
INVENTOR(S) : Shinji Ozaki, et al.

It is certified that error appears in the above-identified patent and that said Letters Patent is hereby corrected as shown below:

Claim 1, column 10, line 30, delete "receptively" and insert therefor --respectively--.
Claim 1, column 10, line 31, delete "head" and insert therefor --heads--.
Claim 2, column 10, line 46, delete "anazimuthinclude" and insert therefor --an azimuth inclined--.
Claim 4, column 10, line 66, delete "drifting" and insert therefor --driving--.
Claim 4, column 11, line 19, delete "or" and insert therefor --for--.
Claim 6, column 11, line 39, delete "ona" and insert therefor --on a--.
Claim 6, column 11, line 64, delete "idea" and insert therefor --video--.
Claim 6, column 12, line 5, delete "idea" and insert therefor --video--.
Claim 6, column 12, line 8, after "rotation" insert --of--.
Claim 6, column 12, line 11, after "audio" insert --head--.
Claim 6, column 12, line 12, delete "he" and insert therefor --the--.
Claim 8, column 12, line 32, delete "sound" and insert therefor --wound--.
Claim 8, column 12, line 50, delete "th" and insert therefor --the--.

Signed and Sealed this

Ninth Day of February, 1993

Attest:

STEPHEN G. KUNIN

*Attesting Officer*   Acting Commissioner of Patents and Trademarks